United States Patent

Coonen

(10) Patent No.: US 6,900,955 B2
(45) Date of Patent: May 31, 2005

(54) METHOD AND APPARATUS PROVIDING VARIABLE SPIN PAD LENGTHS

(75) Inventor: Daniel J. Coonen, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 311 days.

(21) Appl. No.: 09/977,098

(22) Filed: Oct. 12, 2001

(65) Prior Publication Data

US 2002/0176193 A1 Nov. 28, 2002

Related U.S. Application Data

(60) Provisional application No. 60/292,667, filed on May 22, 2001.

(51) Int. Cl.[7] .................................................. G11B 5/09
(52) U.S. Cl. ............................. 360/48; 360/50; 360/51
(58) Field of Search .............................. 360/48, 50, 51, 360/52, 44, 45; 369/275.3

(56) References Cited

U.S. PATENT DOCUMENTS

| | | | |
|---|---|---|---|
| 4,001,883 A * | 1/1977 | Strout et al. .................. 360/48 |
| 5,276,564 A | 1/1994 | Hessing et al. ................ 360/51 |
| 5,307,216 A | 4/1994 | Cook et al. ................. 360/72.1 |
| 5,475,540 A * | 12/1995 | Gold ............................ 360/48 |
| 5,539,795 A | 7/1996 | Takase ......................... 377/39 |
| 5,553,043 A | 9/1996 | Yamaguchi et al. ........... 369/50 |
| 5,650,882 A | 7/1997 | Tsurumi et al. ................ 360/51 |
| 5,678,022 A * | 10/1997 | Maeda ....................... 711/111 |
| 5,706,265 A | 1/1998 | Bang ............................ 369/50 |
| 5,844,865 A | 12/1998 | Bakx ........................... 369/47 |
| 5,886,985 A | 3/1999 | Kobayashi et al. ...... 369/275.3 |
| 5,926,333 A | 7/1999 | Bang ............................ 360/51 |
| 6,115,199 A | 9/2000 | Bang ............................ 360/51 |
| 6,181,498 B1 * | 1/2001 | Kikuchi et al. ................ 360/53 |
| 6,611,391 B1 * | 8/2003 | Murphy et al. ................ 360/50 |

* cited by examiner

*Primary Examiner*—Sinh Tran
*Assistant Examiner*—Daniell L. Negrón
(74) *Attorney, Agent, or Firm*—Theodore M. Magee; Westman, Champlin & Kelly, P.A.

(57) ABSTRACT

A data storage device includes a track layout having three data sections. A first spin pad having a first length is located between a first and second data section. A second spin pad having a length that is different from the first length is located between the second data section and a third data section. A method for determining the lengths of the spin pads is also provided.

4 Claims, 4 Drawing Sheets

METHOD AND APPARATUS PROVIDING VARIABLE SPIN PAD LENGTHS

CROSS-REFERENCE TO RELATED APPLICATION

This application claims priority from U.S. Provisional application No. 60/292,667 filed on May 22, 2001 and entitled METHOD FOR COMPENSATING FOR ROTATIONAL SPEED VARIATIONS IN ROTATING RECORDING SYSTEMS.

FIELD OF THE INVENTION

The present invention relates to disc drive storage devices. In particular, the present invention relates to data layouts on discs in disc drives.

BACKGROUND OF THE INVENTION

In disc drive data storage devices, data is stored in tracks on a disc. In many systems, the data is stored in blocks on the track to allow for localized error detection and correction during reading. Typically, the blocks of data are grouped into sectors that are marked by a reference mark and/or a servo-positioning field. In many systems, the individual blocks within a sector do not include an address field and thus cannot be distinguished from other blocks except by their distance from the reference mark. To access a block, such systems initiate a timer when the reference mark is detected. When the timer expires, the read or write head is assumed to be over the desired block.

One problem with this indirect addressing scheme is that variations in the rotational speed of the disc and variations in the processing time required to identify the reference mark can cause inadequate correlation between the timer and the actual position of the head. Thus, the timer may expire before the head reaches the block or may expire after the head has already passed the beginning of the block.

To avoid having one data section written onto another data section, empty buffer fields known as spin pads are inserted between the data sections. In the past, the spin pads were a fixed size, such that each spin pad along a track had the same length. However, these fixed-length spin pads take up space that could otherwise be used to store data and as such, are an obstacle to increasing data capacity in a disc drive.

The present invention provides a solution to this and other problems, and offers other advantages over the prior art.

SUMMARY OF THE INVENTION

A data storage device includes a track layout having three data sections. A first spin pad having a first length is located between a first and second data section. A second spin pad having a length that is different from the first length is located between the second data section and a third data section. A method for determining the lengths of the spin pads is also provided.

These and various other features as well as advantages which characterize embodiments of the present invention will be apparent upon reading the following detailed description and review of the associated drawings.

DETAILED DESCRIPTION OF ILLUSTRATIVE EMBODIMENTS

Figure 1:
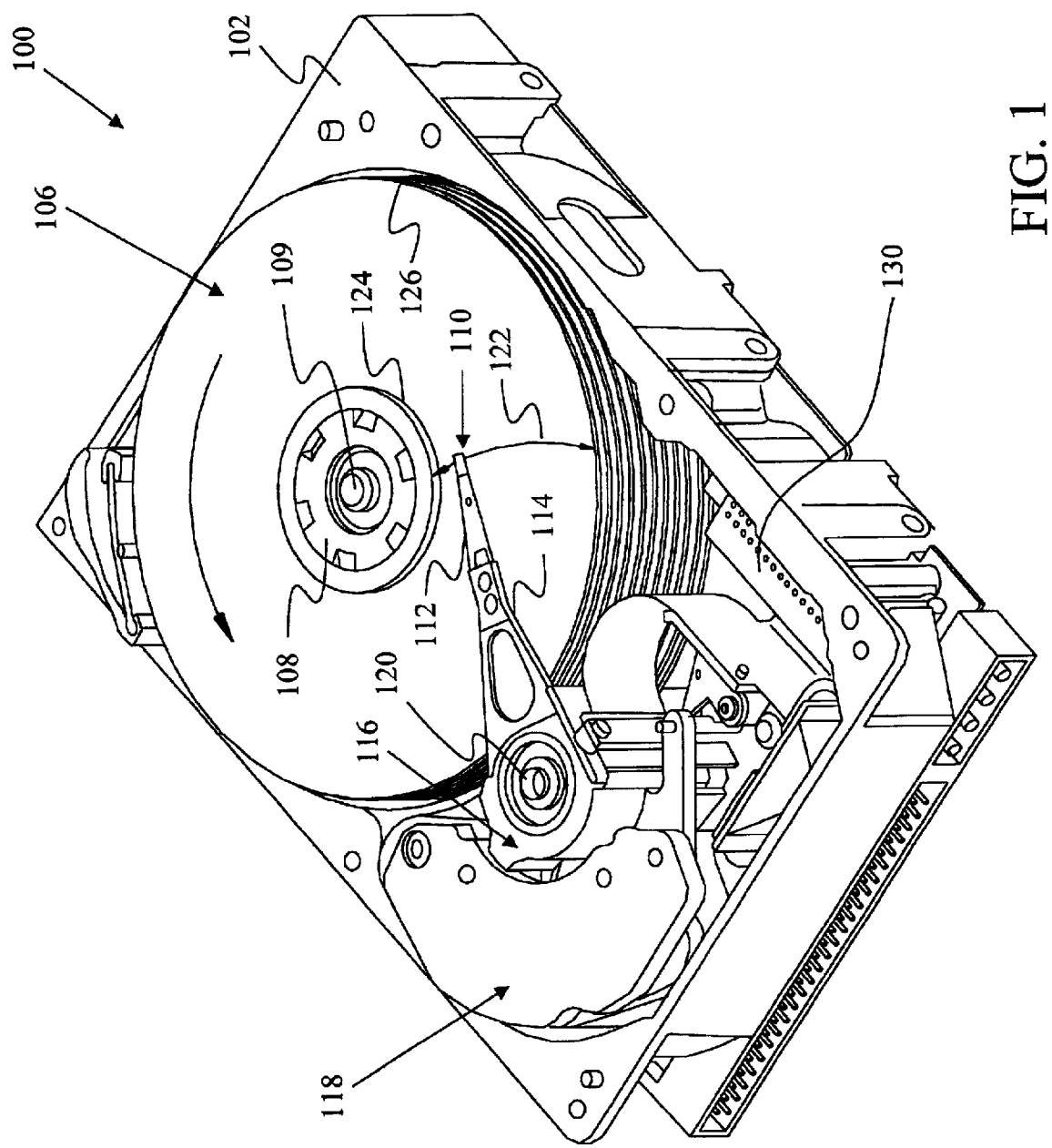
FIG. 1 is an isometric view of a disc drive in which embodiments of the present invention may be practiced.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle 109 by a disc clamp 108. Disc pack 106 includes a plurality of individual discs, which are co-rotated about spindle 109 by a spindle motor (not shown) attached to the bottom of spindle 109. Each disc surface has an associated disc head slider 110 which is mounted to disc drive 100 for communication with the disc surface. As the disc pack is rotated, it generates air circulation through the drive and in particular generates an air bearing between each head slider 110 and each disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
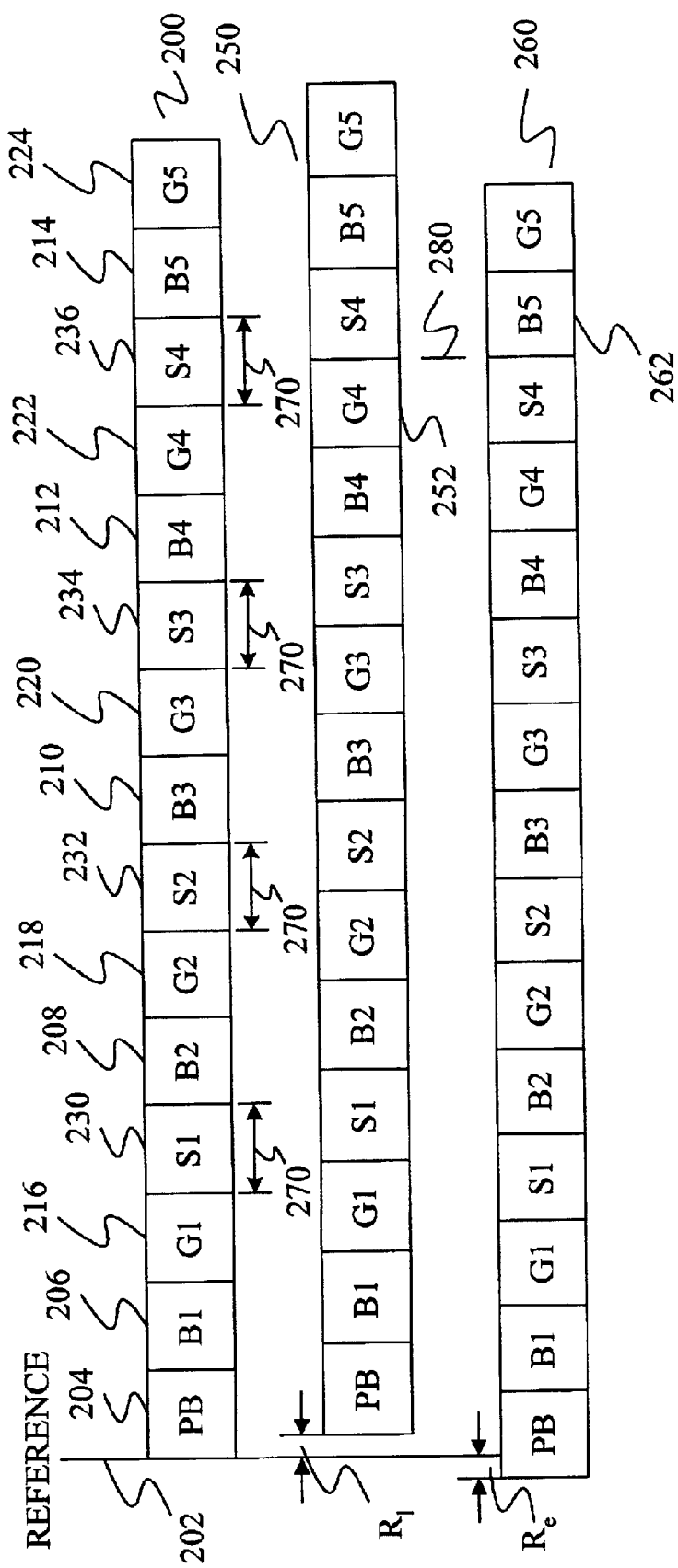
FIG. 2 is a spatial layout showing the position of information read from a track under the prior art under nominal, most distant, and least distant conditions.

FIG. 2 provides a spatial layout showing the relative location of information read from a track having a track layout of the prior art. In particular, FIG. 2 provides three cases: a nominal case 200, a most distant case 250, and an least distant case 260. In each case, the same information is read from the track. The only difference between the three cases is the location of that information. Because of this, the content of the layout is only described below for nominal case 200.

In nominal case 200, the information begins with the detection of a reference mark 202 followed by a pre-data block area 204. Pre-data block 204 can be empty or can include information such as servo positioning information.

The information layout also includes a set of data blocks 206, 208, 210 and 214 and a set of gaps 216, 218, 220, 222 and 224. Data blocks 206, 208, 210, 212 and 214 contain data, and gaps 216, 218, 220, 222 and 224 provide empty regions between the data blocks that allow data from one block to be fully processed before data is read from the next block. Note that the gaps are not required in all systems and are only provided here for the sake of completeness. However, when the gaps are required by a system, the size of the gaps must be maintained. As such, the gaps cannot be overwritten with data from a neighboring block.

A data block and its following gap together form a data section. For systems that do not use gaps, the data block alone forms a data section. For example, in a system that did not use gaps, data block 206 would form a data section but in a system that used gaps, data block 206 and gap 216 would form a data section.

The information layout of the prior art also includes four spin pads 230, 232, 234 and 236 each located between a pair of data sections. Under the prior art, all of the spin pads have the same length and therefore have the same nominal time spans 270, 272, 274, and 276 in FIG. 2. Note that although only one data section is shown between each pair of spin pads, the invention is not limited to this and more than one data section may appear between each spin pad.

As noted in the background, the spin pads are provided to ensure that under a worst case scenario, two data sections are not written over each other. In FIG. 2, the worst case scenario is represented through the combination of data written most distant from timing reference in case 250 and data written least distant in case 260. Most distant case 250 shows the location of the information when the detection of the reference mark is delayed and the head is moving rapidly over the media. In this case, at a given time after detecting reference, the head will be displaced furthest from the reference mark compared to the nominal case. Least distant case 260 shows the location of information with a earlier than normal detection of the reference mark and a slow moving head, resulting the head being closer to the reference mark than the nominal case at any given time after reference mark detection.

Under the prior art system of FIG. 2, the length of the spin pads 230, 232, 234 and 236 are selected to ensure that data block 262 of least distant case 260 will not be written over gap block 252 of most distant case 250. With the spin pads of the prior art properly determined, gap section 252 of most distant case 250 will end at the beginning of data block 262 of least distant case 260. This alignment is shown as occurring at alignment mark 280 of FIG. 2.

Although the prior art is effective at preventing data block 262 from overwriting gap 252, it uses space inefficiently because it uses a fixed size for all of the spin pads. Under the present invention, spin pads have variable lengths that are chosen to prevent overwrite while ensuring efficient use of the space on the disc.

Figure 3:
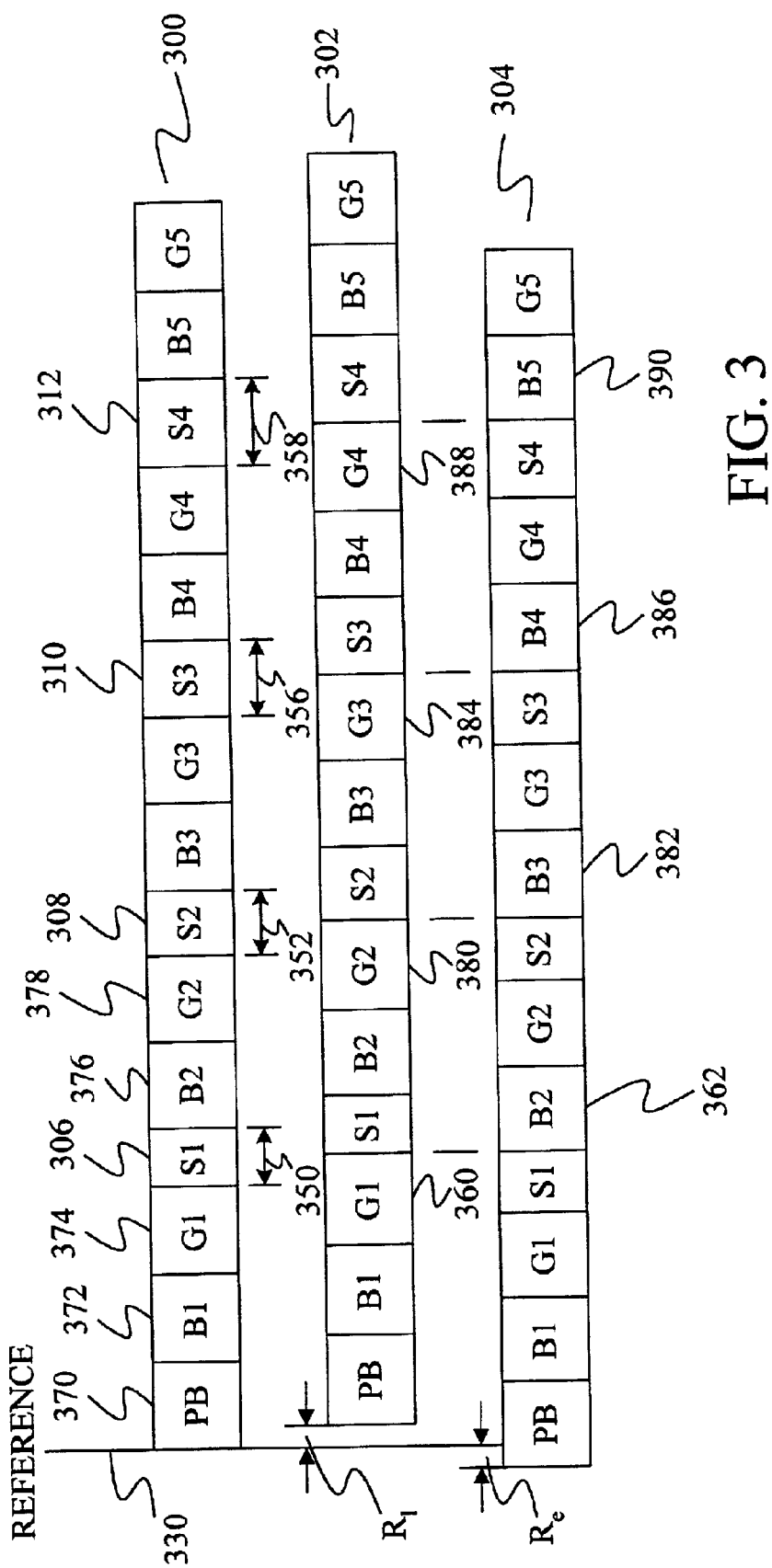
FIG. 3 provides a spatial layout showing the position of information read from a track under embodiments of the present invention under nominal, most distant, and least distant conditions.

FIG. 3 shows three cases for information read from a disc that contains variable length spin pads of the present invention. In particular, case 300 provides a nominal positioning, case 302 provides a most distant positioning, and case 304 provides a least distant positioning. By comparing case 302 to case 304, the worst case location combination can be seen.

In the positioning cases of FIG. 3, the pre-data block, the data blocks, and the gaps are the same as the similarly named sections in FIG. 2. What is different in the positioning diagram of FIG. 3 is that the sizes of spin pads 306, 308, 310 and 312 are all different from each other and are generally shorter than the fixed sizes of the spin pads of FIG. 2. In addition, as is evident from lengths 350, 352, 356, and 358 of spin pads 306, 308, 310 and 312, respectively, the lengths of the spin pads increase as the distance between the spin pads and the reference mark increases. Thus, the length of spin pad 308 is greater than the length of spin pad 306 and the length of spin pad 310 is greater than the length of spin pad 308.

Figure 4:
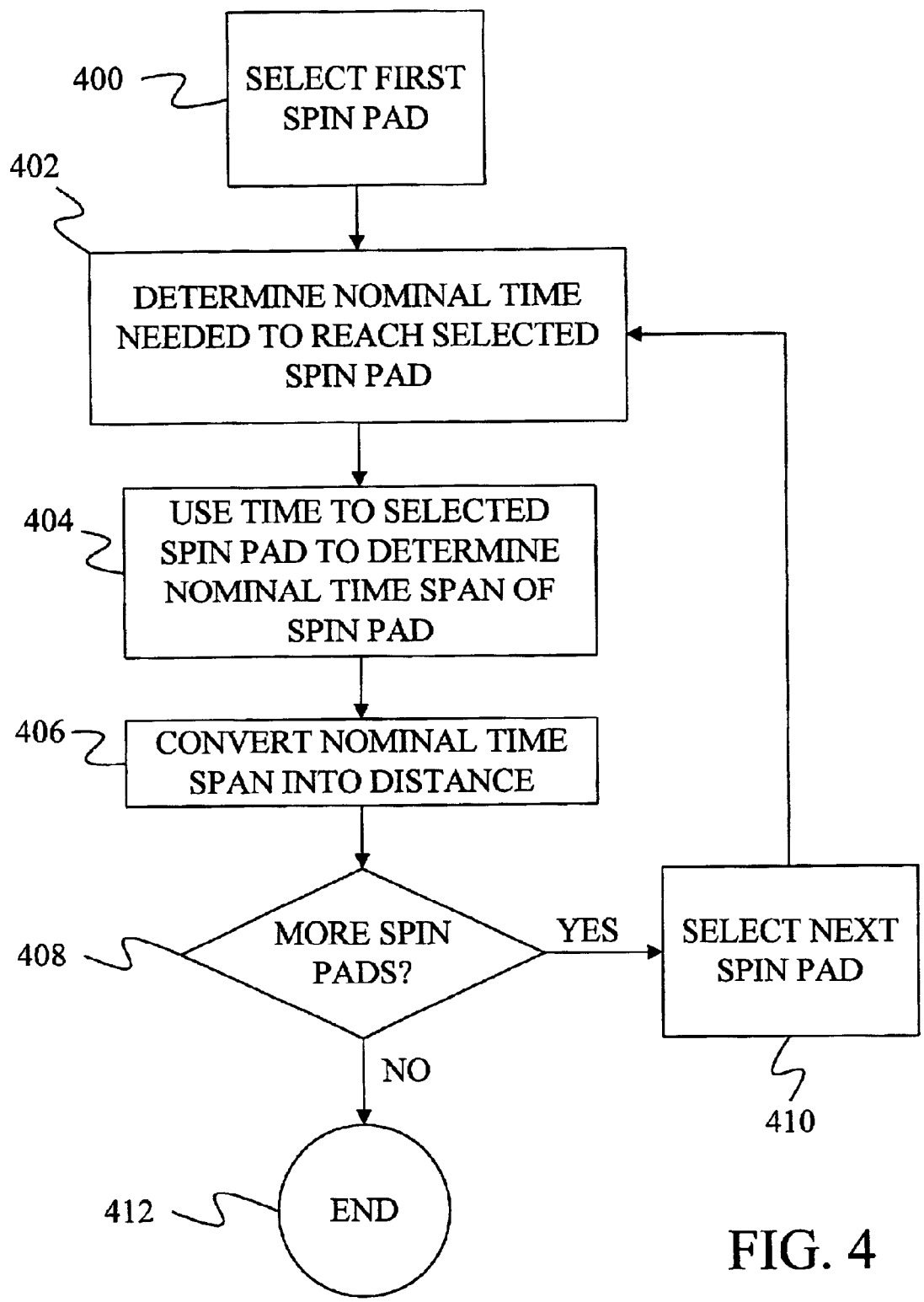
FIG. 4 provides a flow diagram for determining the length of a spin pad under embodiments of the present invention.

FIG. 4 provides a flow diagram of a method of determining the lengths of the spin pads under embodiments of the present invention. In step 400 of FIG. 4, the first spin pad is selected. At step 402, the nominal time needed to reach the selected spin pad from the reference mark is calculated. This nominal time is used in step 404 to determine the desired nominal time span for the spin pad.

The calculation performed in step 404 is based on the worst case scenario represented by the combination of most distant positioning case 302 and least distant positioning case 304 of FIG. 3. In particular, the nominal length of a spin pad is calculated so that when the spin pad appears in most distant case 302 and least distant case 304 the end of a data section in most distant case 302 will be aligned with the beginning of a next data section in early case 304. For example, under the present invention, the nominal length of spin pad 306 is calculated so that the end of gap 360 of most distant positioning case 302 is aligned with the beginning of data block 362 of least distant positioning case 304. This represents the smallest length for the spin pad that will still prevent data overwriting.

To determine the nominal length for the spin pad, the time span needed to reach the point where the end of the data section in the most distant case aligns with the beginning of the data section in the least distant case is determined for both the most and least distant cases. For example, for the most distant positioning case, the amount of time needed to reach the end of gap 360 in most distant positioning case 302 is calculated as:

$$TIME_{GAP} = R_l + k_l(PB + B1 + G1) \qquad \text{EQ.1}$$

where $R_l$ is the maximum amount of delay from nominal that can be expected in identifying the reference mark; PB, P1 and G1 are the nominal times needed to read pre-data block 370, data block 372, and gap 374; and $k_1$ is a time multiplier that provides a factor corresponding to the extra time associated with reading each section due to the head moving faster than nominal over the medium. Thus, $k_1$ should be based on the fastest expected speed for the head.

Similarly, the time needed to reach the beginning of data block 362 in least distant positioning case 360 can be calculated as:

$$TIME_{BLOCK} = -R_e + k_e(PB + B1 + G1 + S1) \qquad \text{EQ.2}$$

where $R_e$ is the maximum time that can be saved if the reference mark is processed faster than nominal; PB, B1, G1 and S1 are nominal amounts of time associated with reading pre-data block 370, data block 372, gap 374 and spin pad 306; and $k_e$ is a timing multiplier that provides a factor corresponding to the head moving over the disc at a speed that is slower than nominal.

To determine time span S1, equations 1 and 2 are set equal to each other and the resulting equation is solved for S1 producing:

$$S1 = \frac{R_l + R_e}{k_e} + \frac{k_l - k_e}{k_e}(PB + B1 + G1) \qquad \text{EQ. 3}$$

Equation 3 can be generalized with the recognition that the values in the parenthesis of equation 3 represent the nominal time needed to reach the beginning of spin pad S1 from the reference mark. Thus, equation 3 can be generalized for any spin pad as:

$$S_x = \frac{R_l + R_e}{k_e} + \frac{k_l - k_e}{k_e}(T_x) \qquad \text{EQ. 4}$$

where $S_x$ is the nominal time span for the xth spin pad, and $T_x$ is the nominal time needed to reach the beginning of the xth spin pad after the reference mark is detected.

Note that equation 4 above explains why spin pads of the present invention increase in size the further they are placed from the reference mark. In particular, it can be seen from equation 4 that the length of the spin pad is a linear function of the distance from the beginning of the spin pad to the reference mark.

Once the nominal time span of the spin pad has been determined in step 404, the nominal time span is converted into a distance at step 406 based on a nominal head speed.

After the length of the selected spin pad has been determined at step 406, the system determines if there are additional spin pad lengths to be calculated at step 408. If there are additional spin pad lengths, the next spin pad is selected at step 410 and the process returns to step 402 to determine the nominal time needed to reach the selected spin pad. Note that upon returning to step 402 in the second iteration, the nominal time needed to reach the second spin pad includes the nominal time span calculated for the first spin pad. For example, the nominal time needed to reach the beginning of spin pad 308 of FIG. 3 includes the nominal time span calculated for spin pad 306 in the first iteration as well as the nominal time needed to cross pre-data block 370, data block 372, gap 374, data block 376 and gap 378. The process of FIG. 4 continues until the length of each spin pad has been calculated. At that point, there are no more spin pads at step 408 and the process ends at step 412.

By following the process of FIG. 4, the data sections in most distant case 302 are aligned with the data sections in least distant case 304 such that the end of one data section in most distant case 302 aligns with the beginning of a data section in least distant case 304. Thus, the end of gap 360 aligns with the beginning of data block 362, the end of gap section 385 aligns with the beginning of block section 382, the end of gap section 384 aligns with the beginning of block section 386, and the end of gap section 388 aligns with the beginning of block section 390.

In the preceding discussion, the reference mark can be a mark used to indicate the beginning of a sector or it could be used to indicate the beginning of any section of data including a portion of a sector. In addition, the pre-data block areas can contain servo information or may be blank. In addition, the present invention does not require the gap areas. In disc drives that do not include gaps, but merely include consecutive data blocks, the ends of one block in the late case timing would be aligned with the beginning of the next block of the early case timing after the appropriate spin pad length has been calculated using the present invention.

In summary, a data storage device (such as 100) is provided that includes a track having a data layout with a first data section (such as 372, 374), a second data section (such as 376, 378) and a third data section (such as B3, G3). A first spin pad (such as 306) is located between the first data section and the second data section and has a first length (such as 350). A second spin pad (such as 308) is located between the second data section and the third data section and has a second length (such as 352) that is different from the first length.

Under some embodiments, the first length and the second length are functions of distances from a reference mark (such as 330). Under further embodiments, the lengths are based on a worst case delay (such as $R_f$) in detecting the reference mark. Under some embodiments, a data section includes a data block and in other embodiments includes a data block and a gap.

A method of determining a length (such as 350) for a spin pad (such as 306) is also provided. The method includes determining a nominal time period between a detection of a reference mark (such as 330) and the beginning of the spin pad. The nominal time period is then used to set the length for the spin pad.

In some embodiments, the step of using the nominal time period to set the length includes multiplying the nominal time period by a rate factor $$\left(\text{such as } \frac{k_l - k_e}{k_e}\right)$$

that is based on a fastest expected speed for a head and a slowest expected speed for the head.

A data storage medium (such as 106) has a track layout that includes a first data section (such as 372, 374) and a second data section (such as 376, 378). The layout also includes overwrite protection means for preventing the first data section from overwriting the second data section wherein the overwrite protection means is based in part on the length of the first data section.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the spin pads while maintaining substantially the same functionality without departing from the scope and spirit of the present invention. In addition, although the preferred embodiment described herein is directed to a track layout for a disc drive system, it will be appreciated by those skilled in the art that the teachings of the present invention can be applied to other systems, like tape drive systems, without departing from the scope and spirit of the present invention.

What is claimed is:

1. A data storage device for storing and accessing data in tracks on a medium, each track having a data layout comprising:

a first data section;

a reference mark before the first data section;

a second data section;

a third data section;

a first spin pad located between the first data section and the second data section and having a first length wherein the first length is a function of the distance from the reference mark to a beginning of the first spin pad and is further based on a worst case delay in detecting the reference mark; and a second spin pad located between the second data section and the third data section and having a second length that is different from the first length but that is based on the first length.

2. The data storage device of claim 1 wherein the second length is a function of the distance from the reference mark to a beginning of the second spin pad.

3. The data storage device of claim 1 wherein the first data section comprises a data block.

4. The data storage device of claim 3 wherein the first data section further comprises a gap.

* * * * *